United States Patent
Carpenter et al.

[11] Patent Number: 5,287,504
[45] Date of Patent: Feb. 15, 1994

[54] FILE ALTERATION MONITOR FOR COMPUTER OPERATING AND FILE MANAGEMENT SYSTEM

[75] Inventors: J. Wiltse Carpenter, Palo Alto; Brendan O. Eich, Santa Clara; Bruce D. Karsh, Los Altos; Eva Manolis, San Francisco, all of Calif.

[73] Assignee: Silicon Graphics, Inc., Mountain View, Calif.

[21] Appl. No.: 882,998

[22] Filed: Dec. 31, 1991

Related U.S. Application Data

[63] Continuation of Ser. No. 389,928, Aug. 1, 1989, abandoned.

[51] Int. Cl.$^5$ .............................................. G06F 15/40
[52] U.S. Cl. ........................... 395/600; 364/DIG. 2; 364/975.4; 364/976
[58] Field of Search ................................. 395/400, 600

[56] References Cited

U.S. PATENT DOCUMENTS 4,825,159 10/1989 Cary et al. .......................... 364/600

*Primary Examiner*—Rebecca L. Rudolph
*Attorney, Agent, or Firm*—LaRiviere & Grubman

[57] ABSTRACT

A server to which clients subscribe for on-the fly notice of alterations to files and directories in a computer having an operating and file management system. The server also provides status of the execution state of executable code, alteration detection for multiple requests from multiple clients, and tracks files and directories on a user's local station. In addition, the server monitors network-mounted files on remote computers even though events are only generated for local activity on network files.

31 Claims, 6 Drawing Sheets

FILE ALTERATION MONITOR FOR COMPUTER OPERATING AND FILE MANAGEMENT SYSTEM

This is a continuation of prior copending application Ser. No. 389,928, filed Aug. 1, 1989, assigned to the assignee of the present application now abandoned.

BACKGROUND OF THE INVENTION

The present invention relates to computer operating and file management systems, particularly to improvements in tools for such systems which enhance user productivity, system management and availability of such systems to a broader spectrum of user levels of expertise. In the context of this invention a tool, is a compact computer program or routine designed to do a specific task well. Typically, several tools can be linked together to perform more complex tasks.

The present invention may be used with graphical user interfaces for use in computer systems of all types and sizes, including large scale mainframes, workstations and microcomputers, whether or not any of the computers are coupled together in a network. In particular, the present invention provides consistent up-to-date status of files on the system as they are altered as well as the execution state of executable programs.

As more computing power is introduced into microprocessor technology and the cost- and size-per-bit of memory devices decreases, more sophisticated programs can be operated on smaller and more compact computer systems. Thus, stand alone microcomputer systems presently available are beginning to approach the speed and computing power, i.e. instruction through-put, of workstations, which, in turn, are beginning to rival main frame computers in their capacity for processing complex computing operations.

Most computer systems designed for use by sophisticated users require a high level of expertise and long hours of familiarization and setup. Typically, thorough knowledge of complex sets of non-intuitive input/output commands and procedures is required before such users can become productive. If the operating and file management systems are changed very substantially as such systems are improved and enhanced, such users must relearn new commands and techniques before becoming fully productive again. Even experts are hindered by complex mechanics of interfacing with such a system.

Nowadays workstations are often part of, or planned for use in, a network. Networks typically require system administration which in the past has been left to the most expert-level user in view of the complexities associated with management of system resources and users. However, the increasing number of workstation users whose expertise does not include system administration highlights the need to simplify network system administration. In particular, system administration tasks that involve customizing a workstation to a user's needs and preferences can and should be done by the users themselves rather than the system administrator.

Networked applications and user interfaces often need to present a status, preferably a "view", of a collection of files. Normally, it is important that the view is up-to-date; i.e., that the view is changed to reflect alterations in the files. Often the file alterations will occur because of actions taken by other programs, including other users. Therefore, the code supporting the views must maintain a status based on any actions taken on the system, rather than just actions taken through an application program.

Many sophisticated workstation networking systems provide disjoint mechanisms for customizing each work station. These mechanisms usually include modifying some file and following some script or simply issuing a set of commands. The scripts and commands normally encrypt a set of non-intuitive options which are focused on completing only one portion of the complete task.

Textual scripts are helpful in getting the job done but lack feedback. Unless the script has good error detection and correction features, the system manager has no immediate feedback as to whether the process really worked. In the graphical user interface of the present invention, the manager is presented with a view of all of the options and states that disks and file systems can achieve without having to know the difficult commands and procedures to achieve those states.

User acceptance of a PC-like workstation or workstation-like PC is influenced or impacted by the new user's initial impression of how easy or difficult it is to bring the system into productive use. If the system requires the user to learn a set of complex tasks and an array of non-intuitive command lines before they can be productive, they may feel that they is working for the machine rather than that the machine is working for them. Thus, presenting a view of the system and how it can be modified to suit the user's needs and preferences is generally regarded as more intuitive and less overwhelming than facing a set of complex input/output commands and procedures.

The popularity of graphical user interfaces, which employ graphic symbols and analog control of cursor movement instead of typewritten entry of commands and cursor keys, has grown very quickly and steadily with the introduction of personal computers for use at home and small businesses by users at all levels of expertise. A visual interface with a computer system helps users feel that their computer is friendlier and, moreover, helps the user work more efficiently and productively with the system.

A user-friendly, interactive, intuitive graphical user interface to powerful computer systems having extensive file and database management systems is advantageous for users at all levels. If such an interface provides an adaptive visual appearance and intuitive flow of information including up-to-date status of files, the entry-level (i.e. beginner) user will not be intimidated, the intermediate-level (i.e. average) user broadens their expertise faster, the advanced-level (i.e. expert) user becomes even more productive, and system administration becomes less complex and more efficient.

SUMMARY OF THE INVENTION

A tool constructed according to the principles of the present invention comprises a server for assisting users in managing files and the actions associated with them by presenting an up-to-date view of the status of the files as they are changed. Whether used with a graphical user interface or not, the server also provides the user with notice of events which alter the content or state of the files.

The present invention is designed for use with powerful, flexible operating systems having the following fundamental characteristics:

1) Substantially all information is stored in a hierarchy; thus, information may be organized by dividing it into various files and directories, which in turn may have subfiles and subdirectories.

2) Each workstation may support more than one user; thus, the present invention anticipates a multi-user environment.

3) The system may very support very sophisticated networking software which allows users to access information on other work stations as easily as if the information was installed on that users work station; if used in a multi-user, networked system the present invention anticipates the need for system administration.

The file alteration monitor of the present invention, is a server to which clients (i.e., users) may subscribe in order to be notified of alterations to files and directories, as well as the execution state of executables. The monitor provides alteration detection for multiple requests from multiple clients and tracks files and directories on a user's local computer. The monitor also tracks network mounted files on remote computers even though events are only generated for local activity on network files.

The monitor driver of the present invention is a pseudo device driver which enables a user level program to monitor filesystem activity. The application program expresses "interest" in specific files by means of first system call. As various types of actions take place on file in which interest has been expressed, the driver posts events through an event list, or "queue", that may be read via a second system call. Thus, the file alteration monitor of the present invention interprets raw events received from the monitor driver into understandable form for the user application.

The present invention is implemented under the UNIX system. UNIX is highly regarded by experts in computer science as a simple, elegant operating and file management system for use on computers having different processing power, ranging from microprocessors to mainframes, and providing a common execution environment across all of them. The system originally developed and introduced by Bell Telephone Laboratories in 1969, has become increasingly widespread. Different versions of it are supported on the equipment of several different computer system manufacturers Details of the UNIX system are given in the references listed below which are incorporated by reference as if fully set forth herein.

Bach, M.J., "The Design of the UNIX Operating System," Prentice-Hall Software Series, Englewood Cliffs, NJ, 1986.

Bourne, S.R., "The UNIX Shell," The Bell System Technical Journal, July–August 1978, Vol. 57, No. 6, Part 2, pp. 1971–1990.

Kernighan, B.W., and R. Pike, "The UNIX Programming Environment," Prentice-Hall, Englewood Cliffs, NJ 1984.

The version of the UNIX system for which the preferred embodiment of the present invention is implemented is called "IRIX", developed and introduced by Silicon Graphics, Inc. IRIX is described in "The IRIX Programmer's Reference Manual," Vols. I, II, III; "The IRIX System Adminstrator's Reference Manual"; The IRIX User's Reference Manual,"Vols. I, II; " IRIS-4D Programmers Guide, " Vols. I, II: "IRIS-4D System Administrator's Guide"; and "IRIS-4D User's Guide", which are also incorporated by reference as if fully set forth herein.

DESCRIPTION OF THE PREFERRED EMBODIMENT

Figure 1:
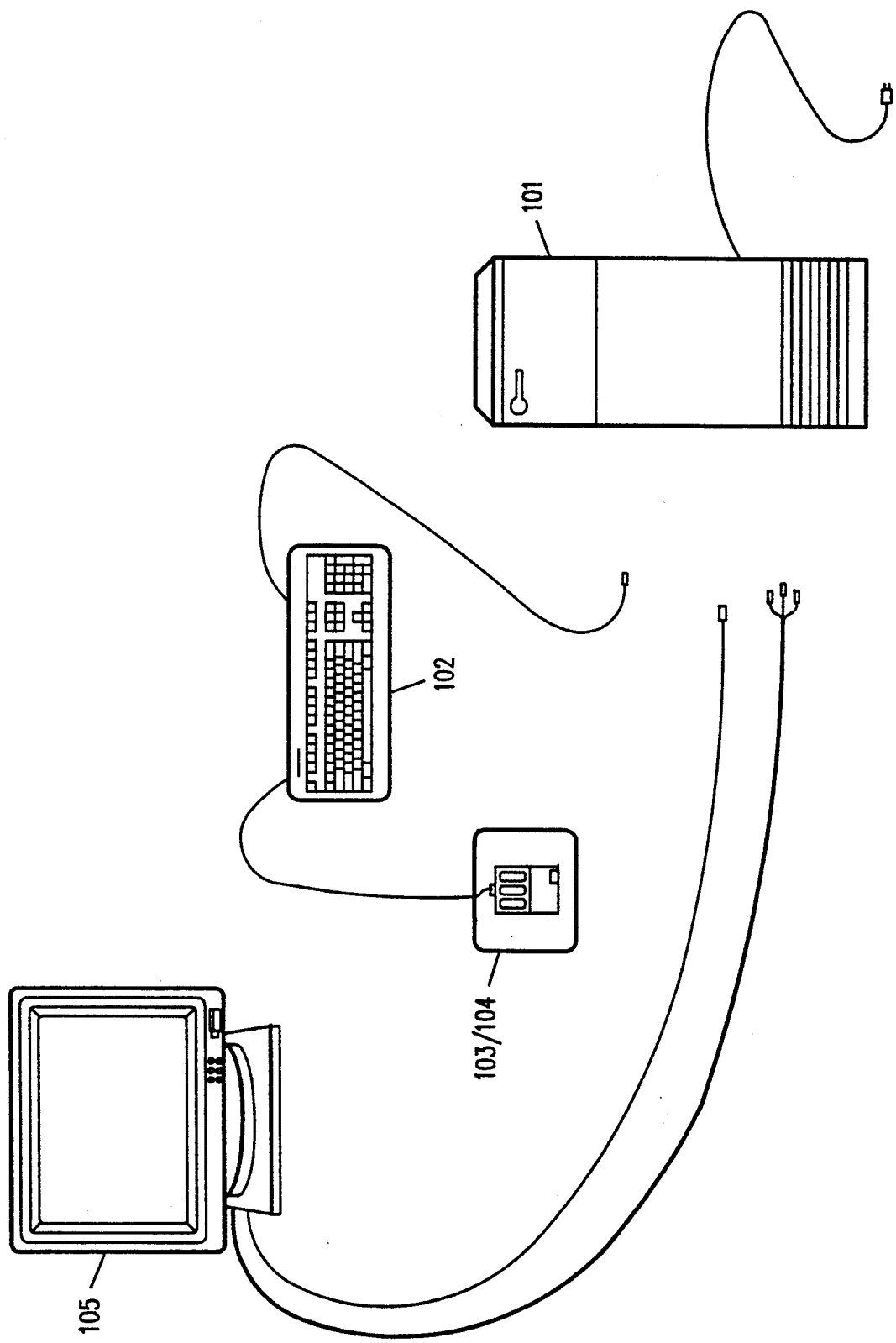
FIG. 1 is a system block diagram of a computer system for use with a file alteration monitor constructed according to the principles of the present invention.

A typical system for using the file alteration monitor of the present invention includes main computing unit 101, keyboard 102, mouse input device 103 with related pad 104 and monitor 105 as shown in FIG. 1. Operating environment programs in a simulated desktop or other working area metaphor, including an up-to-date view of the status of files, are displayed on the screen of display monitor 105.

The file alteration monitor (FAM) of the present invention is a server to which clients subscribe in order to be notified of alterations to, and creation and deletion of, files and directories, and of the execution state of executable code. As FAM detects a file system alteration of interest to the user, it informs the user's operating environment of the change. The operating environment responds by reinterpreting and redisplaying the altered portions of the view, keeping the user up-to-date with the current state of the file system. An operating environment in accordance with the present invention is the IRIS Operating Environment, developed and introduced by Silicon Graphics, Inc. IRIS, including its icon-based interface called WorkSpace, is described in "Programming the IRIS WorkSpace"; "The Personal IRIS Owner's Guide"; and "The IRIS-4D Series Owner's Guide", which are also incorporated by reference as if fully set forth herein.

In any version of UNIX, a file switch comprising a set of program instructions is used to determine which system code, local or network, or other type of file system, to call to execute file access and manipulation. The version of UNIX incorporating FAM according to the present invention also uses the file switch to preselect additional code that generates a queue representing events based on access and manipulation of files. After the queue of the event is created, the actual operation, i.e., access or manipulation, is executed.

In order to communicate with FAM, clients send requests to the server via the function WriteToServer and receive replies via ReadFromServer. FAM is started by inetd when a request is made to FAM's rpc program number. FAM's rpc program number may be determined by executing getrpcbyname ("sig_fam"). (See getrpcent(3Y)). FAM continues running until it has no clients for 30 seconds.

Requests and replies are human and computer readable text strings. Requests comprise a one character request code which identifies the requested service, followed by a request number, followed by any (space separated) arguments needed by the request. The request number is any positive integer between 0 and 4294967295 inclusive, i.e., any number which will fit in an unsigned long). The request number is returned in any reply to the request and is used to modify or cancel previous requests The request number space is not shared across connections to the server which prevents interference between two connections using the same request numbers.

Replies comprise a one character reply code which identifies the type of the reply, followed by the request number which generated the reply, followed by any (space separated) arguments needed by the reply.

SERVICES

Monitor a file or directory. The argument is the full path name of the file or directory which is to be monitored. If the name being monitored is a directory name, then FAM reports changes in the directory or any file within the directory. If the name being monitored is a file name, then FAM reports any change in the file.

Replies from the monitor request consist of a single character representing the type of the reply, followed by the request number, followed by a single space, followed by a filename. For example, a reply might be:

A3097/usr/people/zippy"

meaning that the file requested in request number 3097,/usr/people/zippy, is not there.

The monitor request can return the following replies:
A The filename requested for monitoring is absent.
C The filename being monitored has changed.
D The filename being monitored is or has become a directory.
F The filename being monitored is or has become a file.
X The filename being monitored is executing.
Q The filename being monitored has finished executing.
c The filename within a directory being monitored has changed.
The filename within a directory being monitored has disappeared.
The filename within a directory exists on the first pass or has newly appeared
x The filename within a directory being monitored is executing.
q The filename within a directory being monitored has finished executing.

W Watch a file or directory. The argument is the file name or directory name which is to be watched. The difference between the watch request and the monitor request is that the watch request does not report changes within directories, while the monitor request will. FAM reports any changes in the file or directory which is being watched.

Replies from the watch request, like those from the monitor request, consist of a single character representing the type of the reply, followed by the request number, followed by a single space, followed by a filename. The replies which may come from the watch request, are a subset of the replies which may come from the monitor request:

A The filename requested for monitoring is absent.
C The filename being monitored has changed.
D The filename being monitored is or has become a directory.
F The filename being monitored is or has become a file.
X The filename being monitored is executing.
Q The filename being monitored has finished executing.

Cancel an outstanding request. Cancel replies with a G when the request has been completed. The number of the request to be cancelled is specified by the request number immediately following the C. Cancel has no arguments.

Suspends messages from FAM to the client for a particular request:

A short example of a client of the file alteration monitor of the present invention is given below. It connects to the client, and requests that a particular directory on a particular host be monitored then prints any replies which are sent to it.

```
#include <stdio.h>
#include <sys/types.h>
#include <bsd/netinet/in.h>
#include <sun/netdb.h>
#include "Client.h"
#include "sys/imon.h"
#include "string.h"
#define FAMVERS 1
struct rpcent "getrpcbyname(char*);

main(int argc,char**argv)
(
    fd_set tfds:
    Client   *TheClient;
    char     msg[1000];
    int      stat.sock;
    structrpcent *rpcent;
    if (argc 1=3) {
            printf("usage:client directory hostname/n");
            exit(1);
    }
    rpcent=getrpcbyname("sgi_fam");
    TheClient=new Client0;
    sock    =TheClient.AddServer(argv[2],rpcent.r_number,
    FAMVERS);

//Send a message to the server.

sprintf(msg, "M%d %s
    n", 11,argv[1]);
    printf("M%d %s
    n", 11,argv[1]);
    TheClient.WriteToServer(sock,msg,strlen(msg)+1);

//Watch and print out the replies.

for (;;) {
            FD_ZERO(&tfds);
            FD_SET(sock,&tfds);
            TheClient.ClientSelect(FD_SETSIZE,&tfds,0,0,0);
            stat=TheClient.ReadFromServer(sock,msg,1000);
            if(stat-- 1) {
               perror("ReadFromServer:");
               exit(9);
            }else
               printf("Reply;%s",msg);
)
```

Figure 2:
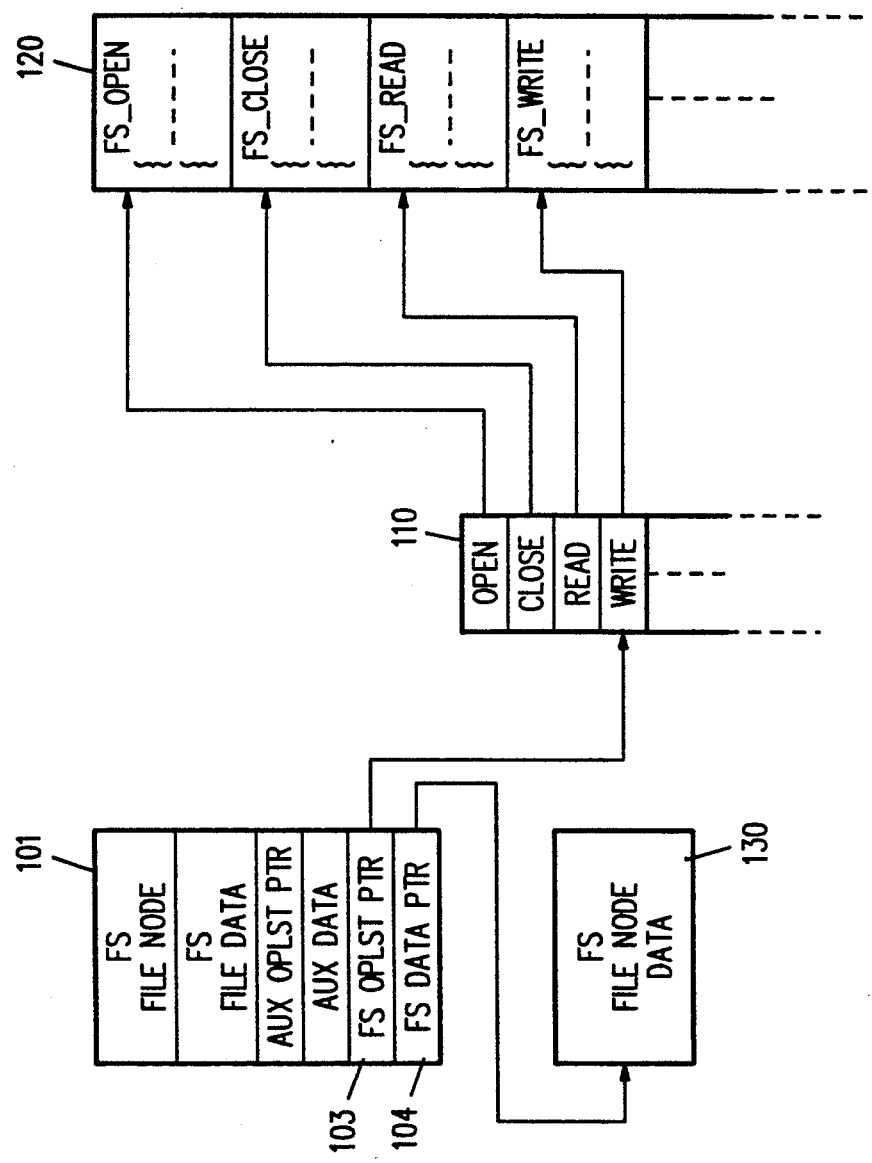
FIG. 2 is a data structure diagram of a prior art file management system implemented under a conventional version of the UNIX operating system.

In traditional UNIX operating systems every active file in the system has a file node which is called an inode. A file node is operated upon by following a pointer to a list of operations pointers then calling that operation as listed through its pointer Thus, in FIG. 2, unmonitored file node 101 includes file system operations list pointer 103 and file system data pointer 104. File system operations list 110 comprises a list of conventional operations pointers for operations such as open, close, read and write. Each of those pointers points to operations listed in file system operations list 120. Each of the operations listed in list 120 comprise executable code for performing the operation as selected by the pointer in list 110.

In addition to file system operations list pointer 103 in file node 101, there is another pointer which points to data, namely file system data pointer 104 which is data specific to the file system type for that node. This well known architecture facilitates a network file system which avoids having to list the kinds or types of file systems on a network. Thus, code need not decide if a given node is any particular type, and then call a specific routine for operation. Instead, the user simply calls pointers which in turn modify data.

Figure 3:
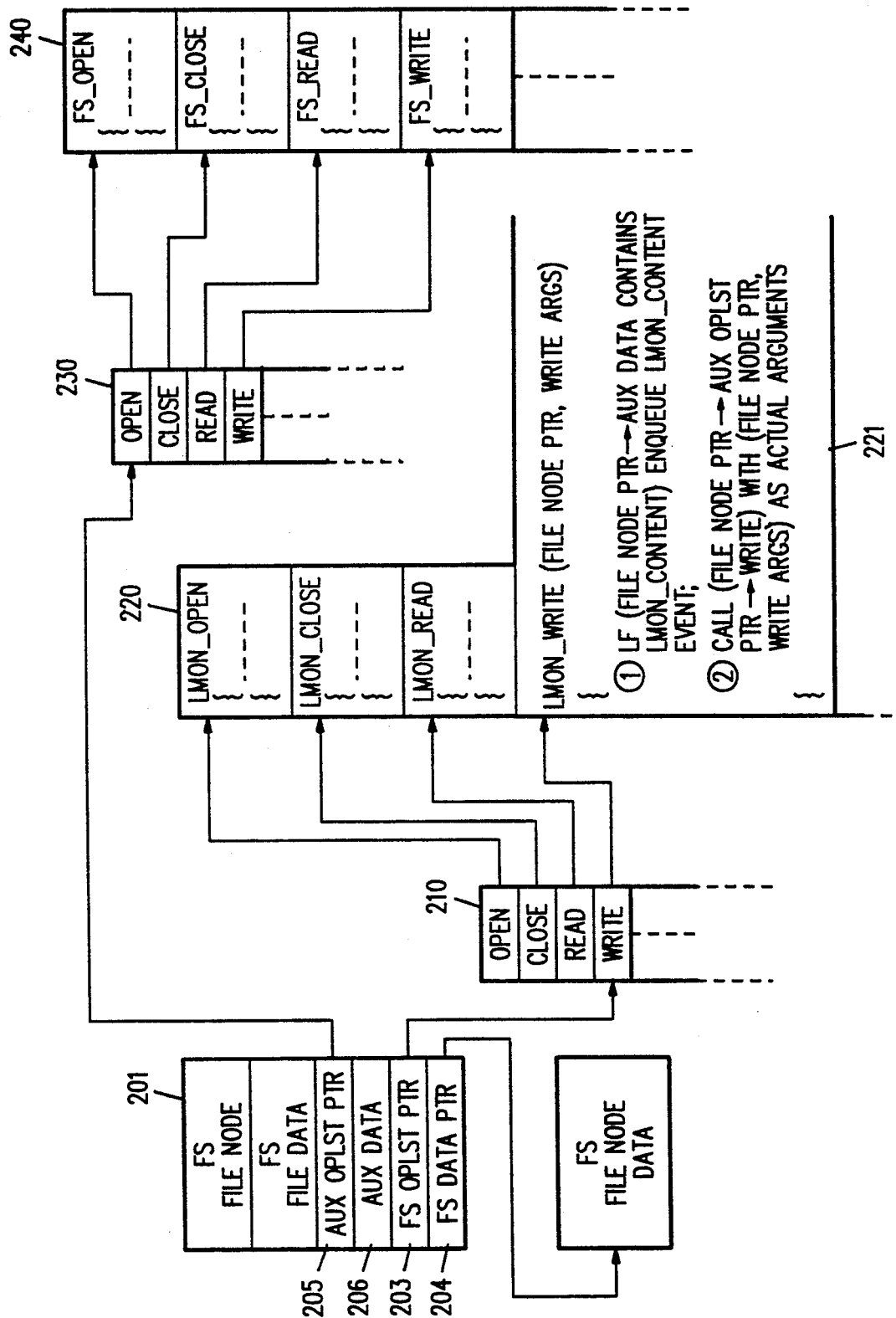
FIG. 3 is a data structure design of a file management system incorporating a file alteration monitor constructed according to the principles of the present invention.

Referring now to FIG. 3, monitored file system file node 201 includes file system operations list pointer 203 and file system data pointer 204. In operation, the file system operations pointer no longer points to a file system operations list but rather points to imon operations list 210. List 210 comprises a list of function pointers that are specific to imon, i.e., the inode monitor driver. Imon operations list 220 comprises executable code which interrogates the data structure in the file node to which has been added additional information accessible via auxiliary operations list pointer 205.

For an unmonitored file node 101, the auxiliary operations list pointer is grounded or maintained at null, and there is no auxiliary data. For monitored file node 201, according to the principles of the present invention, auxiliary operations list pointer 205 points to file system operations list 230 in response to execution of the selected code in list 220. List 230 corresponds to file system operations list 110 of FIG. 2. The pointers listed in file system operations list 230 select operations maintained in file system operations list 240 in the same manner as described for lists 110 and 120 in FIG. 2.

Figure 4:
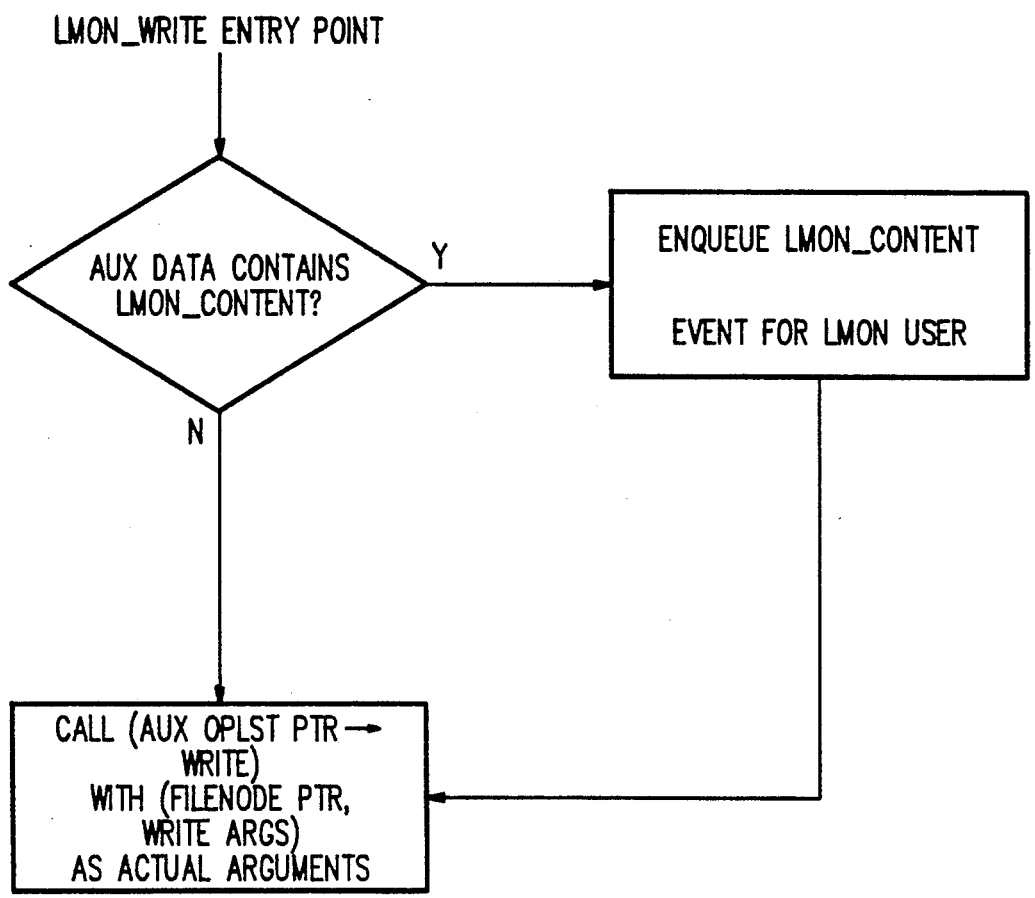
FIG. 4 is a flow diagram of file node auxiliary data for the file alteration monitor of FIG. 3.

Referring to FIG. 4, if auxiliary data 206 in monitored file node 201 contains interest data, referred to as imon_content, events which alter files in which the user has interest are enqueued to provide notice of such events to the user. For example, Imon operations listed in imon operations list 220 each comprise code such as that shown for imon_write function 221. If the user has expressed interest in changes to the content of a file which a write operation affects, then auxiliary data 206 of file node 201 will have imon_content. Thus, if the file node pointer identifies an operation having imon content in auxiliary data 206, then the event is queued and the user is notified of the event.

In the preferred embodiment of the present invention, a pointer to a list of operations pointers and function pointers are layered. The upper layer is concerned about the file node and generic operations related thereto such as open-close read and write. The lower layer is concerned with identifying the file system as a local or network file system.

IMON DRIVER

The operating system in which the imon monitor of the present invention is used maintains a cache of file nodes describing the state of every open or active file in the system. There may be one cache for all file system types, or each file system type may maintain its own cache The process of file typing is described in co-pending application for U.S. patent entitled "File Characterization for Computer Operating and File Management Systems", now U.S. Pat. No. 5,226,163, issued Jul. 6, 1993, which is also assigned to the assignee hereof.

Figure 5:
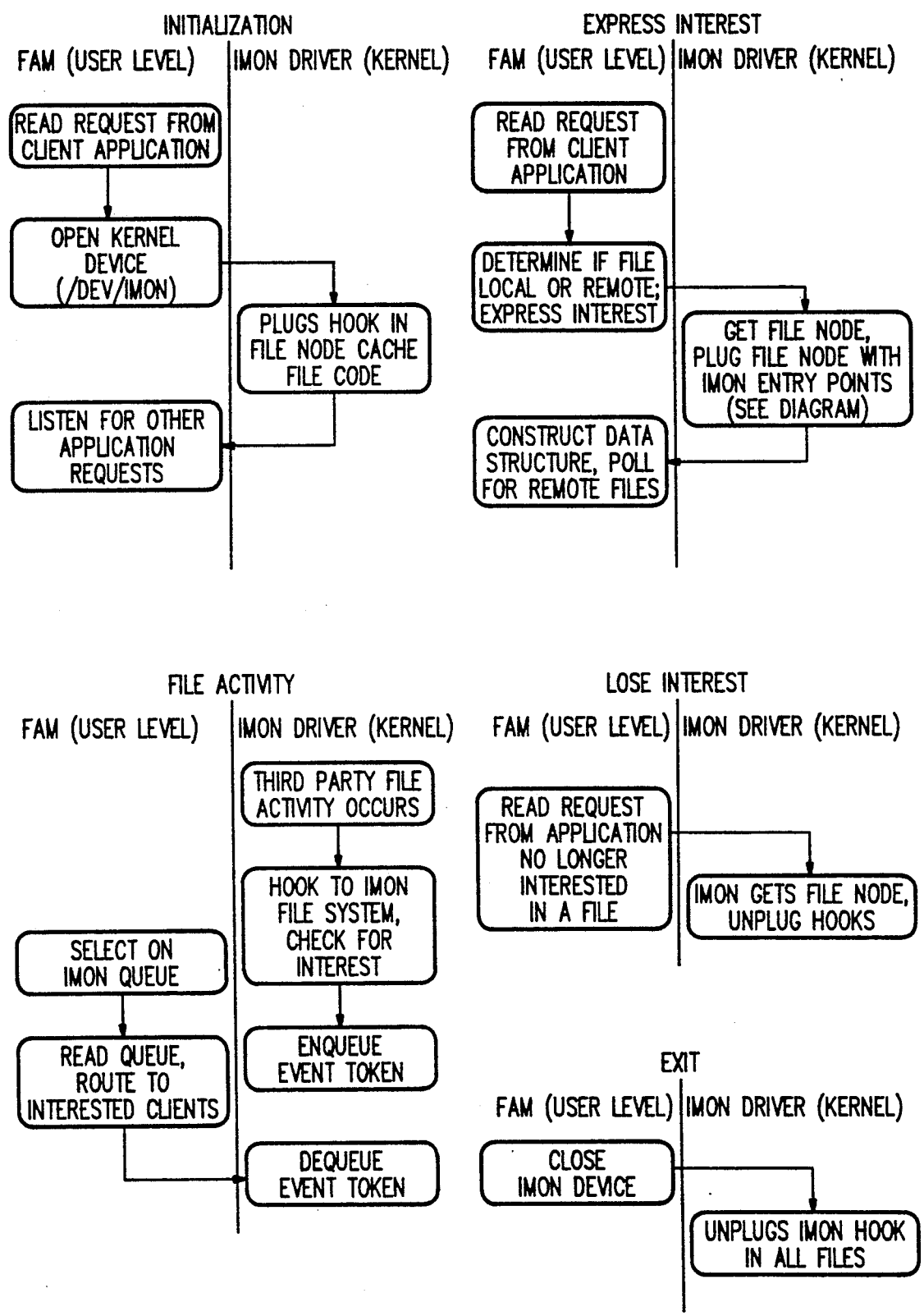
FIG. 5 is a block diagram of the file alteration monitor of FIG. 3.

File nodes, as explained elsewhere in this specification, are conventionally called inodes, and are identified by device and index number. Referring now to FIG. 5, the inode monitor driver, i.e. imon device, works by inserting hooks into the inode cache fill routine so that a drive function, inodeopen, is called every time a new node is brought into the inode cache This routine then looks up the new inode's device and index number in a local hash table to see if a user has expressed interest in it.

Inode structure according to the present invention includes an auxiliary operations list pointer and auxiliary data which is then used to divert control flow from the normal entry points of file system specific code through a set of local file system operations which call their counterparts in the inode's file system code. When a user process expresses interest in an inode, the inode's operations pointer is set to point at a local file system operations table, redirecting all of the file system calls on the inode to the imon driver. Most of the calls are passed through to the inode's real file system operations by using the auxiliary operations pointer in the inode. Routines of "interest" to the user cause an event to be queued for the user process Normally inodes have an operations pointer to a set of file system functions, and a private data pointer to file system-specific data. As an optimization of the present invention, an auxiliary private data field in the inode structure is used to hold a shadow copy of the interest mask for that inode This implementation saves a hash table-lookup operation that would otherwise have to be performed each time an event happens to an inode to see whether that event is one that the user wants to see.

The imon driver of the present invention may be implemented as an exclusive open driver and resides in the kernel of the operating system. A user process can monitor system activity affecting a list of files. The user process expresses interest in files by entering the name of each file via an ioctl system call and then does a read system call on the device to obtain event records. Each event record contains the device and index number of the file and a field describing the action that took place.

The ioctl for expressing interest takes three arguments: 1) the name of the file of interest, 2) a bitmask indicating which events are of interest, and 3) optionally a pointer to a stat buffer in which the current attributes of the file are returned Multiple expressions on the same or different files are permitted. Multiple expressions on the same file accumulate interests. A revoke interest ioctl that takes the same arguments is also available.

Interest bits include:

| | |
|---|---|
| IMON_CONTENT | /* contents or size have changed */ |
| IMON_ATTRIBUTE | /* mode or ownership have change */ |

-continued

| | |
|---|---|
| IMON_DELETE | /* last hard link has gone away */ |
| IMON_EXEC | /* process executing this file */ |
| IMON_EXIT | /* last process exited */ |

The imon driver of a file alteration monitor constructed according to the preferred embodiment of the present invention comprises the functions described below.

Open

Set the inode cache fill hook to point to inodeopen. The hook is a function pointer in the inode cache fill routine, so that it is called the first time an inode is read in from disk, the net, or elsewhere. If the hook is a null pointer, the fill routine does nothing with it.

Close

Null the inode cache fill hook and release data structures.

Express

Express interest in a file and optionally return that file's stat structure. Multiple expressions have their interest bits logically OR-ed together.

Revoke

Revoke interest in a file. Only the specified interest bits are cleared. When the last interest bit for a file is cleared, the underlying inode's interest entry is removed from the hash table.

Test

The qtest ioctl returns non-zero when there are events available in the queue.

Imonread

Read as many events as will fit in the user's buffer. Normally wait for at least one event and then reads as many as are available without blocking If the device is opened in non-delay mode, then it will return immediately with EAGAIN.

Queue

The queue is implemented as a circular list of events. New events are matched against the last QBACKSTEPS events and if the device and index number are the same, then the two event bits are OR-ed together After an event is entered into the queue, a timeout of imon_qlag ticks is set to wakeup the reader. If the queue fills beyond q_thresh elements, the timeout is canceled and the reader is awakened immediately.

Enqueue

Check if the event to enqueue is happening to an inode that already has an event on the queue and if so, logically OR the two event bits together in the already-queued event.

As regards the IMON_EXEC interest bit, if a program execs-exits-execs, then these events turn off their counterparts so the event the user sees reflects the current state.

Decueue

Returns the oldest element on success, zero if the queue is empty. If the queue overflowed, then return a special overflow event.

Figure 6:
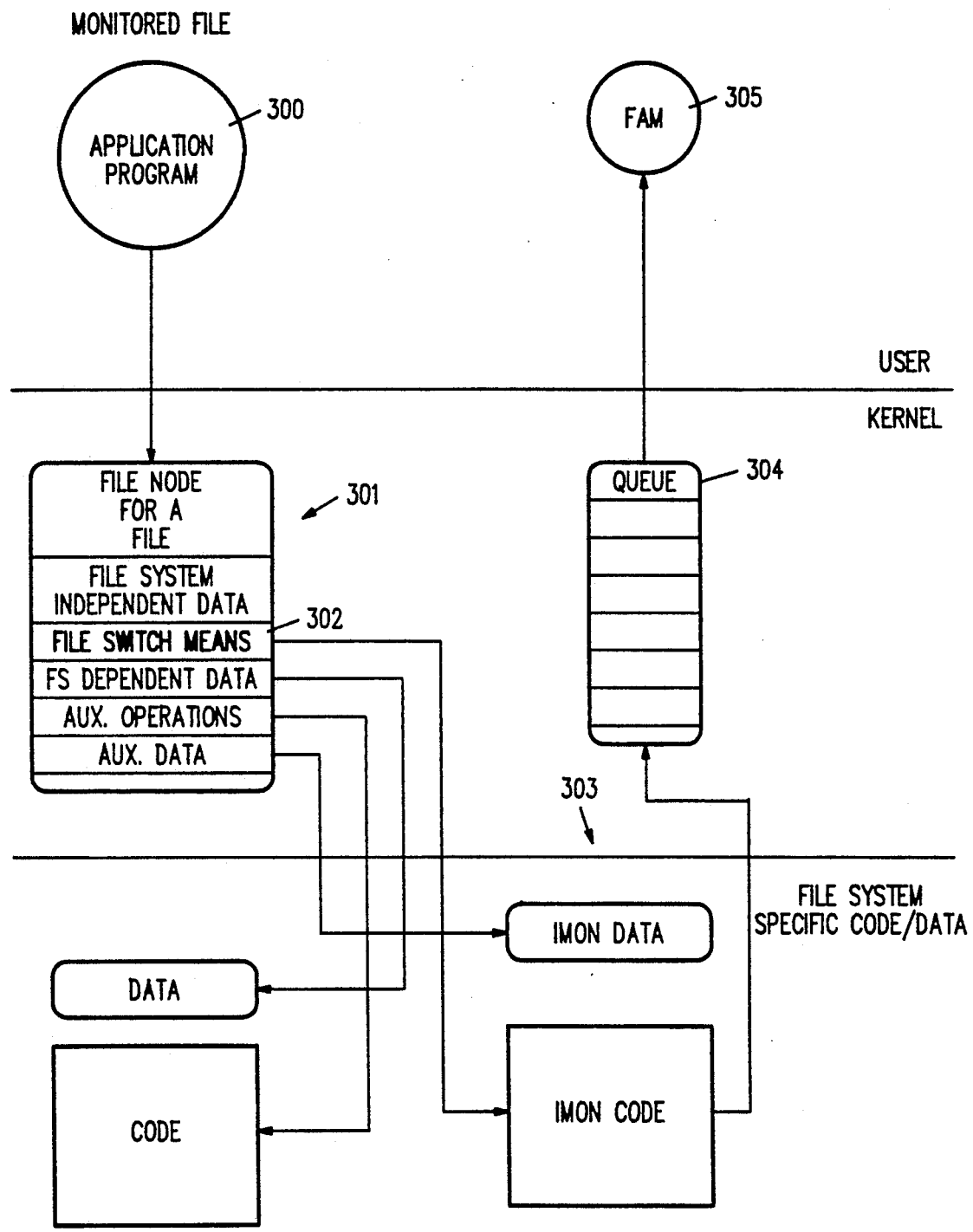
FIG. 6 is a functional block diagram of a portion of a computer system that has been modified in accordance with the principles of the present invention to have an imon means coupled to a file switch means.

Referring now to FIG. 6, there is illustrated a functional block diagram of a portion of a computer system that has been modified in accordance with the principles of the present invention. FIG. 6 is dividied by two horizontal lines into three levels. The upper level is the User Level, the middle level is the kKernel Level, and the lower level is the File System Specific Code/Data level. A calling application program 300 initiates a procedure call requesting alteration of a monitored file. The term "monitored file" means a file identified by a client application program as being a file for which notification of alteration has been requested.

The request for alteration of the monitored file goes to the file system code section 301 of the Kernel Level of the computer system. The file switch means 302 of the file system code section 301 is coupled to the imon means 303 and intercepts the procedure call from the application program file 300. A record of the request for alteration of the monitored file is made on the event queue 304. The file Alteration Monitor (FAM) 305 reads the queue 304 and detects requests for alterations of monitored files is provided to all client application programs that have requested notification of alterations to the monitored files.

Program instructions for implementing the preferred embodiment of the file alteration monitor in accordance with the principles of the present invention are given in Appendix A hereto While preferred forms and arrangements have been described in illustrating the present invention, it is to be understood that various changes in detail and arrangement may be made without departing from the spirit of the present invention or from the scope of the appended claims In particular, while the present invention is implemented under one version of the UNIX system, it should be especially noted that the principles of the present invention are equally applicable and adaptable to other versions of the UNIX system, as well as to any other computer operating system and equipment.

We claim:

1. In a computer system having application programs, an operating system, and files, apparatus for providing notification of alterations to monitored files to client application programs that request such notification, notification being provided to said client application programs upon a calling application program initiating a procedure call for alteration to said monitored file, said apparatus comprising:
   first storage means for storing an imon function pointers list including imon function pointers for pointing to executable code;
   first pointer means coupled to said first storage means for selecting executable code from said imon function pointers list;
   second storage means for storing a system code function pointers list including code for altering said files;
   second pointer means coupled to said second storage means for selecting code for altering files;
   imon means coupled to said first and second storage means for intercepting said procedure call;
   an event queue resident in said imon means for storing a record of the initiation of said procedure call for alteration to said monitored file,
   request storing means resident in said imon means for storing said request for notification of alteration to said monitored file;

means for alteration detection resident in said imon means for correlating said request for notification of alteration to said monitored file with said record of the initiation of said procedure call for alteration to said monitored file; and means resident in said imon means for providing notification to said client application program of said procedure call for alteration to said monitored file; said imon means first rerouting said intercepted procedure call through said imon function pointers list, and then rerouting said procedure call to its original destination for executing said procedure call to alter said monitored file.

2. Apparatus as in claim 1 wherein:
said files include files having executable programs stored therein; and
said imon means also provides notice of the execution status of said executable programs to said client application programs in response to code received from said files having said executable programs stored therein.

3. Apparatus as in claim 2 wherein:
said files may be stored in storage means distributed among nodes of a network; and
said executable programs may be stored at any of said nodes.

4. In a computer system having application programs, an operating system, and files, apparatus for providing notification of alterations to monitored files to client application programs that request such notification, notification being provided to said client application programs upon a calling application program initiating a procedure call for alteration to said monitored file, said apparatus comprising:
storage means for storing function pointers for pointing to executable code;
selection means coupled to said storage means for selecting designated code therefrom;
imon means coupled to said storage means for intercepting said procedure call;
an event queue resident in said imon means for storing a record of the initiation of said procedure call for alteration to said monitored file;
request storing means resident in said imon means for storing said request for notification of alteration to said monitored file;
means for alteration detection resident in said imon means for correlating said request for notification of alteration to said monitored file with said record of the initiation of said procedure call for alteration to said monitored file; and
means resident in said imon means for providing notification to said client application program of said procedure call for alteration to said monitored file; said imon means first rerouting said intercepted procedure call through said storage means, and then rerouting said procedure call to its original destination for executing said procedure call to alter said monitored file.

5. Apparatus as in claim 4 wherein:
said storage means includes first storage means for storing an imon function pointers list and second storage means for storing a system code function pointers list; and
said selection means includes first pointer means coupled to said first storage means for selecting one of said imon function pointers and second pointer means coupled to said second storage means for selecting one of said system code function pointers.

6. Apparatus as in claim 4 wherein:
said files include files having executable programs stored therein; and
said imon means also produces a status indication representing the execution status of said executable programs, said status indication being produced in response to code received from said files having executable programs stored therein, and for transmitting said status indication to client application programs that request such notification.

7. Apparatus as in claim 6 wherein said status indication is transmitted to all client application programs that request such notification in a multi-user networked computer system.

8. Apparatus as in claim 6 wherein said notification of alteration to monitored files and said status indication are transmitted to all client application programs that request such notification in a multi-user networked computer system.

9. Apparatus as in claim 6 wherein:
said operating system further includes user operating environment software; and
said user operating environment software is coupled to said imon means for interpreting and displaying a view of the execution status of said executable programs.

10. Apparatus as in claim 4 wherein said notification of alteration to monitored files is transmitted to all client application programs that request such notification in a multi-user networked computer system.

11. Apparatus as in claim 4 wherein said imon means is coupled to file switch means, said file switch means intercepting procedure calls and providing said procedure calls to said imon means for calling executable file alteration command structures, and for preselecting alteration detection command structures for generating queues for storing code representing events based on the alteration and execution status of the contents of said files.

12. Apparatus as in claim 11 wherein said imon means executes monitored ones of said executable command structures for altering the contents of said files after said queues are created.

13. Apparatus as in claim 4 wherein alterations made to said files include deletion and creation of files.

14. Apparatus as in claim 13 wherein alterations made to said files further include deletion, creation and alterations of file directories.

15. Apparatus as in claim 4 wherein:
said operating system further includes user operating environment software; and
said user operating environment software is coupled to said imon means for interpreting and displaying a view of the altered portions of said files.

16. In a computer system having application programs, an operating system, and files, a method for providing notification of alterations to monitored files to client application programs that request such notification, notification being provided to said client application programs upon a calling application program initiating a procedure call for alteration to said monitored file, said method comprising the following steps:
storing an imon function pointers list including imon function pointers for pointing to executable code;
selecting executable code from said imon function pointers list;

storing a system code function pointers list including code for altering said files;
selecting code for altering files;
intercepting said procedure call;
storing a record of the initiation of said procedure call for alteration to said monitored file;
storing said request for notification of alteration to said monitored file;
correlating said request for notification of alteration to said monitored file with said record of the initiation of said procedure call for alteration to said monitored file; and
providing notification to said client application program of said procedure call for alteration to said monitored file;
first rerouting said intercepted procedure call through said imon function pointers list;
and then rerouting said procedure call to its original destination for executing said procedure call to alter said monitored file.

17. The method as in claim 16 wherein:
said files include files having executable files stored therein; and
said step of providing notification to said client application program includes the step of providing notice of the execution status of said executable programs in response to code received from said files having said executable programs stored therein.

18. The method as in claim 17 wherein the steps of storing an imon function pointers list and storing a system code function pointers list includes the steps of:
distributing storage means among nodes of a network; and
storing said executable programs at any of said nodes.

19. In a computer system having application programs, an operating system, and files, a method for providing notification of alterations to monitored files to client application programs that request such notification, notification being provided to said client application programs upon a calling application program initiating a procedure call for alteration to said monitored file, said method comprising the following steps:
storing a plurality of function pointers that point to executable code;
selecting designated function pointers;
intercepting said procedure call;
storing a record of the initiation of said procedure call for alteration to said monitored file;
storing said request for notification of alteration to said monitored file;
correlating said request for notification of alteration to said monitored file with said record of the initiation of said procedure call for alteration to said monitored file; and
providing notification to said client application program of said procedure call for alteration to said monitored file;
first rerouting said intercepted procedure call through said function pointers;
and then rerouting said procedure call to its original destination for executing said procedure call to alter said monitored file.

20. The method as in claim 19 wherein:
said step of storing a plurality of function pointers includes the steps of storing an imon function pointers list including imon function pointers for pointing to executable code and storing an efs/nfs function pointers list including code for altering said files; and
said step of selecting includes the steps of selecting one of said imon function pointers and selecting one of said efs/nfs function pointers.

21. The method as in claim 9 wherein:
said files include files having executable programs stored therein; and
said step of providing notification to said client application program includes the steps of providing a status indication representing the execution status of said executable programs in response to code received from said files having executable code stored therein and transmitting said status indication to said client application programs that request such notification.

22. The method as in claim 21 wherein the step of providing a status indication representing the execution status of said executable programs includes the step of providing said status indication to all client application programs that request such notification in a multi-user networked computer system.

23. The method as in claim 21 wherein the step of providing notification to said client application program includes the steps of transmitting notification of alteration to monitored files and said status indication to all client application programs that request such notification in a multi-user networked computer system.

24. The method as in claim 21 wherein:
said operating system further includes user operating environment software; and
said step of providing a status indication representing the execution status of said executable programs includes the steps of interpreting and displaying a view of the execution status of said executable programs.

25. The method as in claim 19 wherein the step of providing notification to said client application program includes the step providing notification to all client application programs that request such notification in a multi-user networked computer system.

26. The method as in claim 19 wherein said step of providing notification to said client application program includes the steps of determining which of said function pointers to call for execution, and preselecting function pointers that point to executable code for generating event queues representing events based on alteration and execution status of the contents of said files.

27. The method as in claim 26 wherein said step of generating event queues includes the step of altering the contents of said files after said event queues are created.

28. The method as in claim 19 wherein alterations made to said files include deletion and creation of files.

29. The method as in claim 28 wherein alterations made to said files further include deletion, creation and alterations of file directories.

30. The method as in claim 19 wherein:
said operating system further includes user operating environment software; and
said step of providing notification to said client application program includes the steps of interpreting and displaying a view of the altered portions of said files.

31. A file alteration monitor for use in a computer system having an existing structure kernel, said computer system having a point where file operations change from being a file system independent portion of said kernel to being a file system dependent portion of said kernel, said file alteration monitor comprising:

a plurality of active files resident in said computer system, each of said active files having a file node known as an inode:

an application program resident in said computer system, said application program expressing interest in file system activity in a specific file by means of a first system call;

a file system switch located at the interface between said file system independent portion of said kernel and said file system dependent portion of said kernel, said file system switch being a set of program instructions used to determine which system code to call to execute file access and manipulation;

an inode monitor driver known as an imon and which comprises a pseudo device driver which cooperates with said application program to monitor file system activity, said inode monitor driver maintaining an inode cache of file nodes describing the state of every one of said active files resident in said computer system, said inode cache having a cache fill routine, said inode monitor driver inserting hooks into said inode cache fill routine so that a drive function is called every time a new file node is brought into said inode cache, said cache fill routine then looks up the new file node to determine whether it is said specific file in which interest has been expressed;

said file alteration monitor being hooked into said kernel at said file system switch and using said file system switch to preselect code that generates a queue representing events based on access and manipulation of said specific file in which interest has been expressed, as various types of actions take place on said specific file in which interest has been expressed, said monitor driver posts events through said queue that may be read by a second system call;

after said queue has been created, said file alteration monitor releases said specific file in which interest has been expressed and routes said specific file back through said file system switch to its original destination.

* * * * *